Jan. 27, 1931.  C. PEARSON  1,790,072
LEVER MECHANISM FOR TRACTOR MOWERS
Original Filed Nov. 26, 1926  2 Sheets-Sheet 1

Inventor:
Charles Pearson,
By

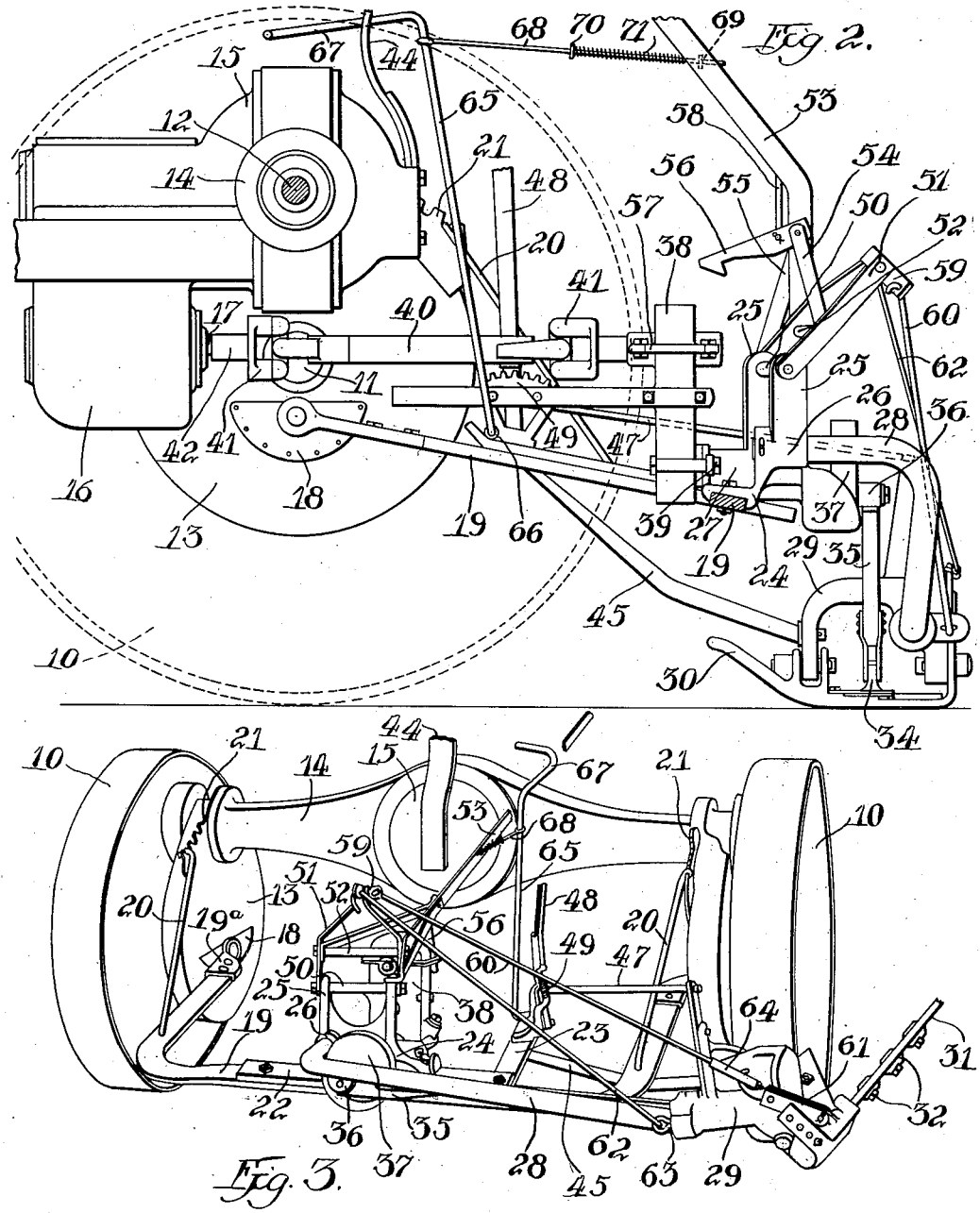

Patented Jan. 27, 1931

1,790,072

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

LEVER MECHANISM FOR TRACTOR MOWERS

Application filed November 26, 1926, Serial No. 150,667. Renewed November 15, 1929.

This invention is in the art of mowers, and relates particularly to a lever adjusting means for the cutter bar of a tractor mower of the type disclosed and claimed in Patent No. 1,627,711 issued May 10, 1927.

A common practice nowadays is to connect a mower attachment to a tractor in such a manner that the same will trail behind the tractor, with its cutter bar laterally disposed in offset relationship to the tractor. In such an arrangement, it is desirable that an efficient, conveniently located, means be provided for adjusting the cutter bar vertically.

The primary object of this invention is to provide such means in the form of a lever and detent mechanism conveniently arranged in a position to be at all times accessible to an operator on his seat on the tractor.

Another object is to provide an assisting means for such lever mechanism.

Still another object is to provide an improved tilting control for the cutter bar.

Other objects of this invention will be apparent as the description thereof progresses.

Briefly, these very desirable objects are accomplished in the provision of a trailing mower attachment, comprising a frame, connected to and mounted on the tractor in such a manner that the same may be entirely supported on the tractor and be connected to and disconnected from the tractor as a unit. The cutter bar extends laterally and rearwardly of the tractor. This cutter bar, of course, must be vertically adjustable with respect to the ground, such adjustment being necessary to avoid obstructions in the field, as is understood in this art. The operator sits on a seat mounted at the rear end of the tractor, and, of course, adjustment of the cutter bar in the manner and for the purpose described must be be under his control. Accordingly, the mower frame carried on the tractor is provided, within convenient reach of the operator, with a lever, said lever having connection with the cutter bar, so that movement of the lever will effect adjustment of said bar. A novel latch or detent is provided for holding the lever locked for the purpose of retaining the bar in raised position. The lever, just mentioned, is designed for hand manipulation. So that this hand operation may be as easily as possible effected, a second lever, designed to be foot operated, is provided for the purpose of assisting the first lever to raise the cutter bar. This second or foot lever, is also conveniently positioned to be readily accessible to the operator. A third lever, also conveniently located, is provided for tilting the cutter bar.

Reference is now made to the accompanying sheets of drawings, wherein:

Figure 2 is a side elevational view of the construction shown in Figure 1; and

Figure 3 is a rear perspective view of the mower attachment and tractor.

Figure 1:
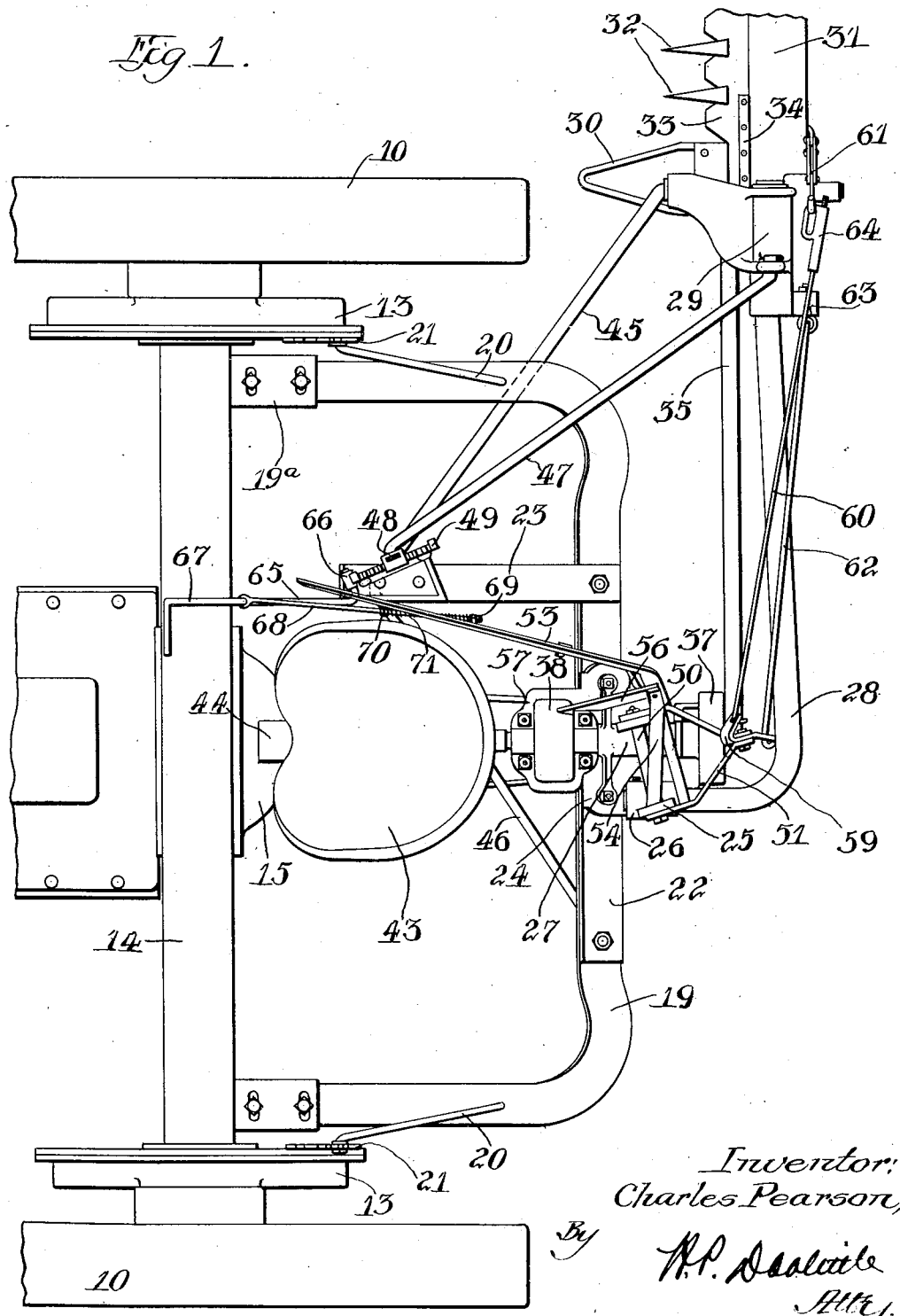
Figure 1 is a plan view, showing the rear end of a tractor, and a mower attachment embodying the improvements of this invention attached thereto.

Inspection of the drawings shows that the illustrative embodiment of this improved mower attachment has been shown in connection with a tractor having rear wheels 10, stub axles 11, a differential drive shaft 12, and depending gear casings 13, which house gearing for connecting the shaft 12 to drive said stub axles 11 and the wheels 10. The shaft 12 is enclosed in a housing 14 to which is centrally bolted the differential housing 15 in which are carried the gears which drive the said shaft. Forwardly of the housing 14 is a transmission housing 16 from which rearwardly protrudes a power take-off shaft 17. Each of the casings 13 carries a gudgeon plate 18 from which are pivotally hung the legs of a U-shaped drawbar 19, which may be regarded as forming part of the attachment and which extends rearwardly of the tractor and is additionally supported by means of links 20 adjustably hung in notched plates 21 bolted to the top of the casings 13. The legs of the drawbar 19 have shiftable pivot brackets 19ᵃ readily detachable from the gudgeon plates. So much of the tractor description will suffice for the purposes of this disclosure.

Carried on the bight portion of the drawbar 19, is a frame comprising a plate 22 fastened to the drawbar and extending forwardly therefrom, and secured thereto is a right angularly disposed plate 23, as shown. Carried on the plate 22 and bolted thereto, is a centrally arranged supporting casting or member 24 which is formed with two integral, spaced, upstanding arms 25. In this casting are formed two spaced, longitudinally arranged, sockets 26 and 27, respectively. In the socket 26 there is rockably mounted a rearwardly and laterally extending coupling bar 28, which rockably carries at a point substantially rearwardly of the right end tractor wheel 10, a mower coupling yoke 29, which in turn pivotally carries a conventional mower shoe 30. Said shoe has connected thereto a cutter bar 31 carrying the usual guard fingers 32, between which operates the conventional cutting mechanism 33.

The cutting mechanism is provided with a pitman head 34 which has connected thereto a pitman 35, the left hand end of which is operatively connected to a wrist pin 36 eccentrically carried on a flywheel 37. The flywheel 37 is mounted on the rear end of a longitudinally arranged shaft (not shown), which shaft passes through the socket 27 in the member 24, the shaft continuing forwardly and into the lower end of a housing 38, which is bolted to the front side of the member 24 by the bolts 39. This casing encloses cut gears which are driven from a flexible shaft 40 disposed in line horizontally with the power take-off shaft 17, protruding rearwardly from the tractor transmission, as has been heretofore described. The shaft 40 is made flexible by the interposition therein of universal knuckles 41, the forward one of which in practice will have a telescoping splined connection 42 to the shaft 17 on the tractor.

The housing 38 is dust proof and will contain a lubricant so that the gears therein may be run in oil, said oil being distributed, in practice, to lubricate the shaft which carries the flywheel 37 as well as the wrist pin 36.

It can now be seen that the cutting mechanism of the mower will be reciprocated by the pitman 35 connected to the flywheel 37, which is rotated through the connections described, from the power take-off shaft 17 of the tractor. The operator's seat on the tractor is indicated at 43, the same being mounted on a support 44, as shown.

For the purpose of maintaining the cutter bar in its lateral position, a coupling arm 45 is connected to the front end of the yoke 29 and to the front end of the plate 23 in any suitable manner. Another brace, in the form of a rod 46, is provided between the front end of the plate 23 and the drawbar.

The cutter bar may be tilted by rocking the yoke 29, through the medium of a rod 47 connected to the yoke and to a lever 48 associated with a conventional rack and detent mechanism 49 secured to the forward end of the plate 23 in a manner making the same readily accessible from the seat 43.

The improved lever adjusting means for vertically adjusting the cutter bar will now be described.

It will be remembered that the casting or member 24 is formed with two upstanding arms 25. These arms, at their upper ends, rockably carry a pin or shaft 50, on which is mounted an arch 51, the arch in turn carrying a rigid pin 52 on which is carried a long lever 53 within reach of an operator on the seat 43. A brace 54 connects said lever with the pin 52, and a second brace 55 connects the lever with the other pin 50. The lever carries a pivoted hook or latch 56, which may engage over a flange 57 formed adjacent the top side of the gear housing 38. This latch may be controlled by any suitable form of detent link 58, as will be readily understood. When the hook 56 is latched on the gear housing, the cutter bar can be retained in adjusted position raised above the ground, for the purpose of passing an obstruction or for transport, as shown in Figure 3. It is to be noted that such lift of the cutter bar can be accomplished by means of a bent piece 59 connected to the arch 51. A link 60 is connected to one free end of this bent piece and to a pull link 61 attached to the cutter bar 31, while the other free end of the bent piece receives a second link 62, which is connected to the back side of the coupling yoke at 63.

It can now be seen that forward movement of the hand lever 53 will rock the arch 51 and pull on the links 60 and 62 to raise the coupling arm and cutter bar to its plain or intermediate lift position, as shown in Figure 3. Slight forward movement of the lever 53 will raise the bar sufficiently to clear ordinary obstructions, without latching the hook 56, and thus, when the obstruction has been cleared, release of the lever 53 by the operator will permit the bar to return to normal cutting position on the ground, by gravity.

For absolute vertical lift of the bar, as when transporting the mower attachment, the lever 53 will first be moved forwardly until the hook 56 automatically locks over the flange 57 on the gear housing 38. The parts are then as shown in Figure 3 with the yoke 29 raised above the ground, and the bar is in its intermediate lift position. Then the operator manually disconnects a screw eye 64 from the pull link 61 and from the link 60 on which said eye is threaded. The cutter bar is now free to be raised manually to a vertical position. The end of the link 60 is then passed through a hole (not shown) intermediately of the ends of the cutter bar, and the screw eye 64 is once more threaded to the end of the link 60 to hold the bar in this vertical position, as will be readily understood.

Of course, in practice, any suitable form of counterbalancing spring may be utilized for the purpose of making operation of the hand lever 53 easy. Such spring has not here been shown.

An additional lever mechanism, designed herein to be foot operated, has been provided for assisting the hand lever, or for conjoint actuation, to raise the cutter bar over slight obstructions.

This mechanism comprises a vertical lever 65 having at its lower end a bent end rockably fitted in the base of the member 49, at 66, said lever having at its upper end a forwardly bent portion forming a foot treadle 67. Near its upper end, the lever 65 carries a rearwardly extending link 68, the rear free end of which slidably fits in an eye 69 turnable on the lever 53. The link 68 carries fast thereon a washer 70, and a spring 71 is fitted on the link 68 between said washer and eye 69. It will be noted that the foot treadle is disposed over the rear axle housing of the tractor where it is readily accessible to the foot of an operator occupying the seat 43.

In operation, the hand lever 53 may be employed for raising the cutter bar to intermediate lift position with the latch locked on the gear housing. For clearance of slight obstructions requiring less than a complete lift of the bar to intermediate position, the foot actuated lever 65 will be employed, the same pulling, through the connection described, the hand lever forwardly to raise the bar. Release of the foot lever permits the bar to return to ground engaging position by gravity. If it is desired to raise the bar to its full intermediate position with the latch retaining the bar locked in such position, then the foot treadle is pushed forwardly to bring the hand lever forwardly part of the way. The remaining part of the lifting action is then completed by use of the hand lever until the latch 56 engages the flange 57 on the gear housing. In this locked position, the weight of the parts has been shifted forwardly of the axis on the pin 50. Thus, when it is desired to release the latch by means of the detent link 58, the spring 71 acts to force the weight of the parts back over the axis on the pin 50, whereupon the force of gravity completes the return of the cutter bar to ground engaging position.

With this detailed description, it can now be seen that all of the desirable objects heretofore recited are achieved, and that the structure for accomplishing these objects is simple and very effective for the purposes intended, with no great likelihood that anything will get out of order.

It should be understood that only an illustrative embodiment of this invention has been disclosed and that the same may assume other forms in practice without departing from the spirit and scope of this invention as is indicated in the following claims.

What is claimed as new is:

1. The combination with a tractor drawbar, of a mower attachment including a cutter bar connected thereto, and means carried by the drawbar for vertically adjusting and tilting said cutter bar.

2. The combination with a tractor drawbar, of a mower attachment including a cutter bar connected thereto, means carried by the drawbar for vertically adjusting the cutter bar, and other means carried by the drawbar for tilting said cutter bar.

3. The combination with a tractor drawbar, of a frame centrally carried by the drawbar, a mower connected to said frame, means on the frame for adjusting the mower vertically, and means on the frame for tilting the mower.

4. The combination with a tractor drawbar, of a frame centrally mounted on the drawbar, a mower comprising a cutter bar connected to said frame, a lever on the frame connected to the cutter bar for vertically adjusting the bar, and a second lever on the frame connected to tilt said cutter bar.

5. The combination with a tractor drawbar, of a frame thereon, a supporting member on the frame, a coupling arm connected rockably to the member, a coupling yoke rockably connected to the arm, a mower cutter bar pivotally connected to the yoke, means on the member connected to the cutter bar for vertically adjusting the same, and means on the frame connected to said yoke for tilting the cutter bar.

6. The combination with a tractor drawbar, of a frame carried by said bar, a mower attachment including a cutter bar connected to said frame, a lever mechanism on said frame for vertically adjusting said cutter bar, a plate extending from said frame, and a lever mechanism on said plate for tilting said cutter bar.

7. The combination with a tractor drawbar, of a mower attachment including a cutter bar connected to said drawbar, means on the drawbar for adjusting the cutter bar to a vertically raised position, a gear housing on the draw bar, and means associated with said first mentioned means engageable with said housing for retaining the cutter bar in raised position.

8. The combination with a tractor drawbar, of a mower attachment including a cutter bar connected to said drawbar, a lever on the drawbar for adjusting the cutter bar to raised position, a gear housing on the drawbar, and means connected to the lever and engageable with said housing for holding the cutter bar in its raised position.

9. The combination with a tractor drawbar, of a mower attachment including a cutter bar connected to said drawbar, a lever on the drawbar for adjusting the cutter bar to raised position, a gear housing on the drawbar, and a latch pivotally connected to the lever and engageable with said housing for holding the cutter bar in its raised position.

10. The combination with a tractor drawbar, of a mower attachment including a cutter bar connected to said drawbar, means on the drawbar for adjusting the cutter bar to vertically raised position, a gear housing on the drawbar, a flange on the gear housing, and means associated with said first mentioned means engageable with said flange for holding the cutter bar in its raised position.

11. The combination with a tractor drawbar, of a mower attachment including a cutter bar connected to said drawbar, means carried by the drawbar for raising the cutter bar, and lever means for assisting said first mentioned means.

12. The combination with a tractor drawbar, of a mower attachment including a cutter bar connected to said drawbar, a lever carried by the drawbar for raising the cutter bar, and a second lever for moving said first mentioned lever.

13. The combination with a tractor drawbar, of a mower attachment including a cutter bar connected to said drawbar, a hand lever carried by the drawbar for raising the cutter bar, and a foot lever carried by the drawbar for assisting the hand lever.

14. The combination with a tractor drawbar, of a mower attachment including a cutter bar connected to said drawbar, and a pair of interconnected levers on said drawbar for adjusting the cutter bar.

15. The combination with a tractor drawbar, of a mower attachment including a cutter bar connected to said drawbar, a lever carried by the drawbar for adjusting the cutter bar, a second lever carried by the drawbar for adjusting the cutter bar, and means connecting said levers for conjoint action.

16. The combination with a tractor drawbar, of a frame carried by said bar, a mower attachment including a cutter bar connected to said frame, means on the frame for raising the cutter bar, a plate extending from said frame, and a second means mounted on said plate and connected to the first mentioned means for raising said cutter bar.

17. The combination with a tractor drawbar, of a frame carried by said bar, a mower attachment including a cutter bar connected to said frame, a lever on the frame for adjusting the cutter bar, a plate extending from said frame, a second lever mounted on said plate for adjusting said cutter bar, and means connecting said levers.

18. The combination with a tractor drawbar, of a mower including a cutter bar connected to said drawbar, means carried by the drawbar for tilting the cutter bar, means carried by the drawbar for vertically raising the cutter bar, and lever means carried by the drawbar for assisting said last mentioned means.

19. The combination with a tractor drawbar, of a mower including a cutter bar connected to said drawbar, a lever for tilting the cutter bar, and a pair of interconnected levers for raising the cutter bar, all of said levers being carried by the drawbar.

20. The combination with a tractor having a rear drawbar support, of a mower attachment including a cutter bar connected to said support, and a pair of conjointly movable levers carried by the support for vertically adjusting the cutter bar.

In testimony whereof I affix my signature.

CHARLES PEARSON.